US012709120B2

(12) United States Patent
Frenne et al.

(10) Patent No.: US 12,709,120 B2
(45) Date of Patent: Aug. 18, 2026

(54) TIRE PRESSURE REGULATION

(71) Applicant: VOLVO CONSTRUCTION EQUIPMENT AB, Eskilstuna (SE)

(72) Inventors: Nicklas Frenne, Torshälla (SE); Robin Öberg, Torshälla (SE); Stefan Dahlberg, Arboga (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 36 days.

(21) Appl. No.: 18/788,250

(22) Filed: Jul. 30, 2024

(65) Prior Publication Data

US 2025/0058591 A1 Feb. 20, 2025

(30) Foreign Application Priority Data

Aug. 18, 2023 (EP) .................................... 23192224

(51) Int. Cl.
*B60C 23/00* (2006.01)
*B60C 23/19* (2006.01)

(52) U.S. Cl.
CPC ................................. *B60C 23/002* (2013.01)

(58) Field of Classification Search
CPC ...... B60C 23/002; B60C 23/19; B60C 23/004
USPC ........................................................... 701/36
See application file for complete search history.

(56) References Cited

U.S. PATENT DOCUMENTS

| | | | | |
|---|---|---|---|---|
| 2017/0015148 | A1 | 1/2017 | Serret et al. | |
| 2017/0043623 | A1 | 2/2017 | Bowman et al. | |
| 2017/0225415 | A1* | 8/2017 | Turner | B60C 23/00372 |
| 2020/0269640 | A1* | 8/2020 | Duncan | B60C 23/004 |

FOREIGN PATENT DOCUMENTS

| | | | |
|---|---|---|---|
| DE | 8715177 | U1 | 1/1988 |
| DE | 202010013162 | U1 | 3/2012 |
| EP | 0621144 | A1 | 10/1994 |
| EP | 2196336 | A2 | 6/2010 |
| WO | 2016189273 | A1 | 12/2016 |
| WO | 2017116631 | A1 | 7/2017 |

OTHER PUBLICATIONS

Extended European Search Report, European Application No. 23192224.6, mailed Feb. 15, 2024, 7 pages.

* cited by examiner

*Primary Examiner* — Hossam M Abd El Latif
(74) *Attorney, Agent, or Firm* — Sage Patent Group

(57) ABSTRACT

A system is disclosed for regulating the pressure of fluid in at least one tire of a vehicle, the system comprising a reservoir comprising fluid at a first pressure higher than the pressure of the fluid in the tire, a compressor configured to receive fluid from the tire and supply it to the reservoir, and processing circuitry configured to receive data representing at least one condition of the fluid in the tire, determine a desired change to the condition, and if the desired change comprises an increase in the pressure of the fluid in the tire, cause fluid from the reservoir to be supplied to the tire or if the desired change comprises a decrease in the pressure of the fluid in the tire, cause fluid from the tire to be supplied to the reservoir via the compressor.

15 Claims, 3 Drawing Sheets

TIRE PRESSURE REGULATION

CROSS REFERENCE TO RELATED APPLICATIONS

This application claims priority to European Patent Application No. 23192224.6, filed on Aug. 18, 2023, the disclosure and content of which is incorporated by reference herein in its entirety.

TECHNICAL FIELD

The disclosure relates generally to vehicle operation. In particular aspects, the disclosure relates to systems and methods for regulating the pressure of fluid in at least one tire of a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

In many vehicle operations, tire pressure can have a large impact on vehicle performance. This is particularly the case in construction environments, for example loading and hauling operations that may be performed on uneven ground. In some operations, a high tire pressure may be desired in order to reduce tire deformation, resulting in lower losses and improved energy efficiency during transport. A high tire pressure may also improve the stability of a vehicle when lifting a load and moving the vehicle centre of gravity upwards. In some operations, a low tire pressure may be desired in order to increase traction, or to enable more material to be loaded on the vehicle without significantly increasing energy usage. A low tire pressure can also act as a form of suspension to reduce the transmission of vibrations from uneven ground to the operator and machine. A difference in tire pressure between the front and rear wheels can also be beneficial during loading operations.

If the tire pressure is not at a suitable value for a particular operating state of a vehicle, tire wear, fuel consumption, vehicle stability, and the like can be impacted. In a construction environment with heavily loaded vehicles operating on irregular terrain, the wrong tire pressure can adversely affect the stability of the vehicle during operation. For example, a lower pressure will increase tire deformation, which results in a risk of overheated tires that can cause rim-tire slip, delamination, or other damage. The drivetrain of the vehicle may also be affected by torque build-up from any difference in wheel radius. While in some cases the suspension can be altered with the weight of the machine (e.g. so that an unloaded machine has a stiffer suspension than a loaded machine with the same tire pressure), inadequate adjustment can result in poor results when the vehicle travel is loaded/unloaded. A difference in tire pressure between the front and rear wheels can also cause traction slip and friction wear on constant all-wheel drive vehicles when traveling. Therefore, tire pressure should be adapted according to the specific operational state of the vehicle.

In many vehicles, the tire pressure must be adapted manually, for example by an operator of the vehicle. There exist tire pressure regulation systems that attempt to control tire pressure in different ways. In one example, air surrounding a vehicle is compressed and provided to the tires. In another example, compressed air cylinders are implemented in wheel rim spokes to provide air to the tires. However, these approaches tend to be slow acting, only suitable for small tire volumes and pressure changes, and limited by available space in the wheel.

It is therefore desired to develop a solution for tire pressure regulation that addresses or at least mitigates some of these issues.

SUMMARY

This disclosure attempts to address the problems noted above by providing systems, methods and other approaches for regulating the pressure of fluid in at least one tire of a vehicle by transferring fluid between a high-pressure reservoir and a tire in order to change the pressure in the tire. This enables rapid adaptive adjustment of tire pressure during vehicle operation dependent on the operating conditions of the vehicle, and tire cooling by transporting heat energy from the tires to the reservoir. This is particularly advantageous in cases where load conditions or ground conditions change frequently during vehicle usage, and provides improvements in tire wear, fuel consumption, vehicle stability, and the like.

According to a first aspect of the disclosure, there is provided a system for regulating the pressure of fluid in at least one tire of a vehicle the system comprising a reservoir fluidly coupled to the tire and comprising fluid at a first pressure higher than the pressure of the fluid in the tire, a compressor configured to receive fluid from the tire and supply it to the reservoir, and processing circuitry configured to receive a desired change to at least one condition of the fluid in the tire, and if the desired change comprises an increase in the pressure of the fluid in the tire, cause fluid from the reservoir to be supplied to the tire, or, if the desired change comprises a decrease in the pressure of the fluid in the tire, cause fluid from the tire to be supplied to the reservoir via the compressor. If the desired change comprises a decrease in the temperature of the fluid in the tire, cause fluid from the reservoir to be supplied to the tire and cause fluid from the tire to be supplied to the reservoir.

The first aspect of the disclosure may seek to alleviate current issues with tire pressure regulation systems. A technical benefit may include rapid and adaptive adjustment of tire pressure during vehicle operation. This ensures that, in situations such as changing load or ground conditions, it is ensured that the tire pressure is appropriate for the specific operating condition. By circulating fluid between the tire and the reservoir, the pressure and temperature of the tire can be regulated as part of a work cycle, ensuring an appropriate pressure can be provided without undue heating of the temperature in the tire.

Optionally, in some examples, the system further comprises a valve configured to regulate the flow of fluid between the reservoir and the tire based on a signal from the processing circuitry. A technical benefit may include reliable control of fluid transport between the tire and the reservoir.

Optionally, in some examples, the compressor is configured to compress the fluid to the first pressure, and supply the compressed fluid to the reservoir. A technical benefit may include the pressurisation of fluid when it is supplied from the tire to the reservoir, enabling the fluid to be reused to increase the pressure in the tire when necessary.

Optionally, in some examples, the condition of the fluid in the tire comprises a pressure of the fluid in the tire and/or a temperature of the fluid in the tire. A technical benefit may include increased flexibility of how to determine whether a change in tire pressure is required, and how the pressure should be changed.

Optionally, in some examples, the processing circuitry is configured to receive data representing the at least one condition of the fluid in the tire, and determine the desired change to the condition based on the received data. A technical benefit may include providing a reactive system for regulating pressure. For example, a change can be determined based on actual operating conditions that reflect how the vehicle should perform.

Optionally, in some examples, the received data comprises sensor data from the vehicle or a user input received by the processing circuitry. A technical benefit may include providing adaptability for how the pressure is to be regulated, for example based on a sensor input indicating actual operating conditions or a user input that can be provided, for example, ahead of a change in operating conditions.

Optionally, in some examples, the fluid is air. A technical benefit may include good and rapid adjustability of pressure in the tires, and that the system can be implemented into existing vehicles of different types that use pneumatic tires.

Optionally, in some examples, the reservoir has a fixed volume. A technical benefit may include the provision of a fixed size system that can be easily implemented into existing vehicles of different types.

Optionally, in some examples, the system is configured such that the reservoir and the tire form a closed loop system. A technical benefit may include a reduced need to resupply the system after use. Furthermore, the time and power required to fill the reservoir after use is reduced. This means that the system is applicable to vehicles with long operating times or that are used in remote locations.

Optionally, in some examples, the system further comprises a cooling system associated with the reservoir configured to regulate the temperature of the fluid in the reservoir. A technical benefit may include cooling of the tire, as the fluid is both be cooler initially and becomes even cooler at a lower pressure. Without cooling of the tank, it would be the hot part of the system that would radiate heat and lower the tire temperature somewhat if not the compressor would add heat into the system. Furthermore, cooling enables the system to operate at safe and efficient conditions, thereby extending the lifetime of the system.

Optionally, in some examples, the at least one tire comprises two or more tires on a common axle of the vehicle. A technical benefit may include the provision of a compact system that is able to regulate pressure in multiple tires at once, thus reducing the footprint of the system on the vehicle. This can also ensure that tires on a common axle are operating at the same pressure.

According to a second aspect of the disclosure, there is provided a vehicle comprising the system.

Optionally, in some examples, the vehicle is a construction vehicle such as wheel loader or articulated hauler. A technical benefit may include that the system can be implemented into existing vehicles of different types that encounter varying load and ground conditions, where tire pressure can significantly affect vehicle operation.

According to a third aspect of the disclosure, there is provided a computer-implemented method for regulating the pressure of fluid in at least one tire of a vehicle, the method comprising, by processing circuitry of a computer system, receiving a desired change to at least one condition of the fluid in the tire, and if the desired change comprises an increase in the pressure of the fluid in the tire, causing fluid at a pressure higher than the pressure of the fluid in the tire to be supplied from a reservoir to the tire, or, if the desired change comprises a decrease in the pressure of the fluid in the tire, causing fluid from the tire to be supplied to the reservoir via a compressor.

The third aspect of the disclosure may seek to alleviate current issues with tire pressure regulation systems. A technical benefit may include rapid and adaptive adjustment of tire pressure during vehicle operation. This ensures that, in situations such as changing load or ground conditions, it is ensured that the tire pressure is appropriate for the specific operating condition. By circulating fluid between the tire and the reservoir, the pressure and temperature of the tire can be regulated as part of a work cycle, ensuring an appropriate pressure can be provided without undue heating of the temperature in the tire.

Optionally, in some examples, the computer-implemented method further comprises causing a valve to regulate the flow of fluid between the reservoir and the tire. A technical benefit may include reliable control of fluid transport between the tire and the reservoir.

Optionally, in some examples, causing fluid from the tire to be supplied to the reservoir comprises causing the compressor to compress the fluid to the first pressure and supply the compressed fluid to the reservoir. A technical benefit may include the pressurisation of fluid when it is supplied from the tire to the reservoir, enabling the fluid to be reused to increase the pressure in the tire when necessary.

Optionally, in some examples, the condition of the fluid in the tire comprises a pressure of the fluid in the tire and/or a temperature of the fluid in the tire. A technical benefit may include increased flexibility of how to determine whether a change in tire pressure is required, and how the pressure should be changed.

Optionally, in some examples, the computer-implemented method comprises, by the processing circuitry, receiving data representing the at least one condition of the fluid in the tire, and determining the desired change to the condition based on the received sensor data or user input. A technical benefit may include providing a reactive system for regulating pressure. For example, a change can be determined based on actual operating conditions that reflect how the vehicle should perform.

Optionally, in some examples, the received data comprises sensor data from the vehicle or a user input. A technical benefit may include providing adaptability for how the pressure is to be regulated, for example based on a sensor input indicating actual operating conditions or a user input that can be provided, for example, ahead of a change in operating conditions.

According to a fourth aspect of the disclosure, there is provided a computer system comprising processing circuitry configured to perform the computer-implemented method.

According to a fifth aspect of the disclosure, there is provided a computer program product comprising program code for performing, when executed by processing circuitry, the computer-implemented method.

According to a sixth aspect of the disclosure, there is provided a non-transitory computer-readable storage medium comprising instructions, which when executed by processing circuitry, cause the processing circuitry to perform the computer-implemented method.

The disclosed aspects, examples (including any above examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

Like reference numerals refer to like elements throughout the description.

DETAILED DESCRIPTION

The detailed description set forth below provides information and examples of the disclosed technology with sufficient detail to enable those skilled in the art to practice the disclosure.

In many vehicle operations, changes in tire pressure can have a large impact on vehicle performance. If the tire pressure is not at a suitable value for a particular operating state of a vehicle, this can have an impact on tire wear, fuel consumption, vehicle stability, and the like. Existing tire pressure regulation systems tend to be slow acting, only suitable for small tire volumes and pressure changes, and limited by available space.

To remedy this, systems, methods and other approaches are provided for regulating the pressure of fluid in at least one tire of a vehicle by transferring fluid between a high-pressure reservoir and a tire in order to change the pressure in the tire. The system is arranged so that pressurized air can be released into tires rapidly from the high-pressure reservoir and provided back to the reservoir when no longer needed in the tires. This enables rapid adaptive adjustment of tire pressure during vehicle operation dependent on the operating conditions of the vehicle, and tire cooling by transporting heat energy from the tires to the reservoir. This is achieved adaptively and automatically during operation, therefore enabling ideal tire conditions for all operational conditions and eliminating need for manual tire pressure adjustments. This is particularly advantageous in cases where load conditions or ground conditions change frequently during vehicle usage, and provides improvements in tire wear, fuel consumption, vehicle stability, and the like.

Figure 1:
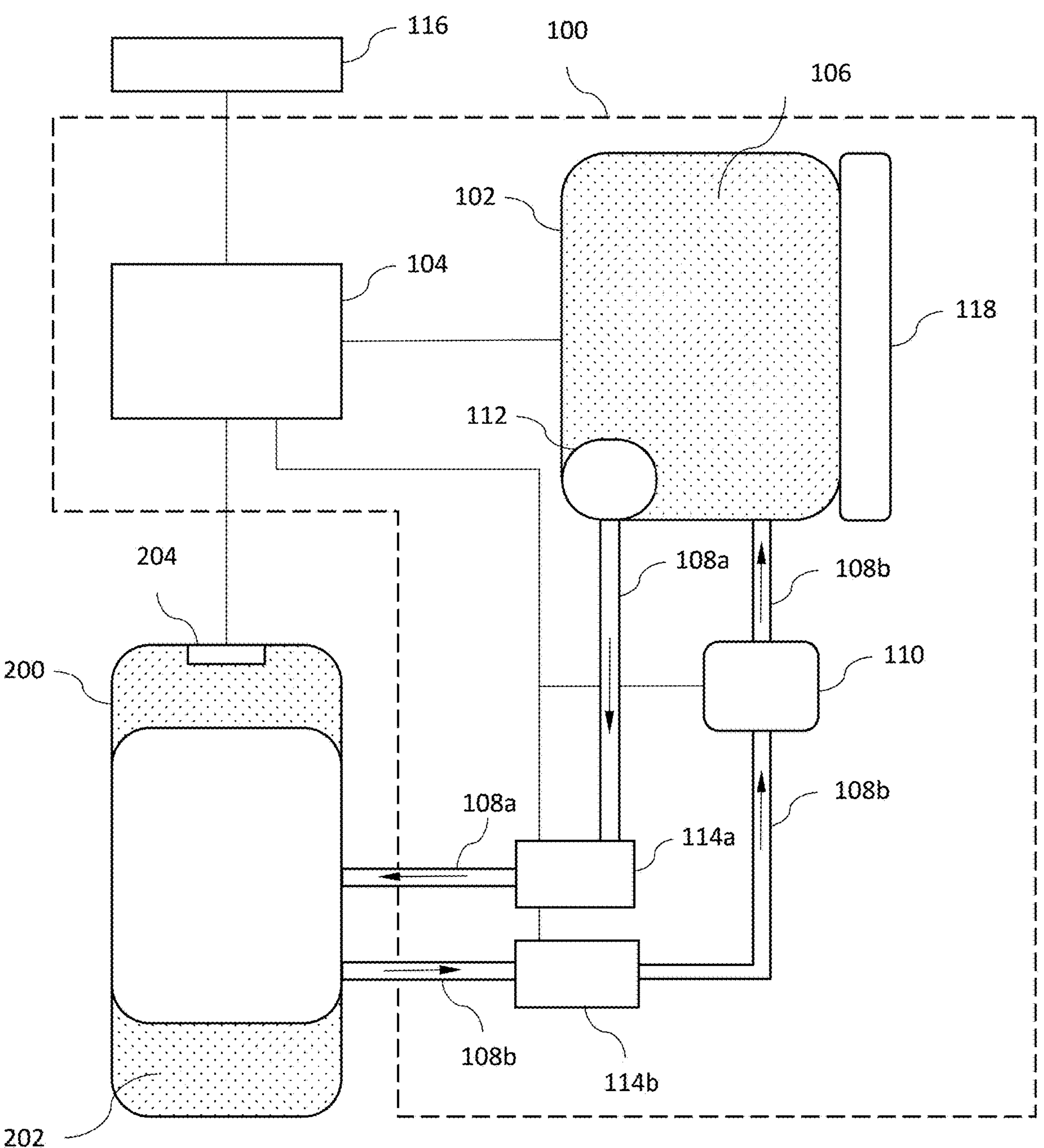
FIG. 1 schematically shows a system for regulating the pressure of fluid in at least one tire of a vehicle, according to an example.

FIG. 1 schematically shows a system 100 for regulating the pressure of fluid in at least one tire of a vehicle, according to an example. The system 100 can be used to implement rapid and adaptive control of tire pressure movement detecting a condition of the tire and acting accordingly. The system 100 comprises a reservoir 102 and a control unit 104 for controlling fluid flow between the reservoir 102 and at least one tire 200 of a vehicle. The reservoir 102 contains fluid 106 at a first pressure. The tire 200 contains fluid 202 at a second pressure. The first pressure is higher than the second pressure.

The reservoir 102 may be configured to store the fluid 106 at relatively high pressures. This enables to system 100 to be designed in a compact manner and, as it will be discussed below, may also contribute to increased cooling performance of the system 100. In some examples, the reservoir 102 may have a fixed volume. This enables the system 100 to be easily implemented into existing vehicles of different types.

The reservoir 102 is configured to be fluidly coupled to the tire 200. For example, the reservoir 102 may be fluidly coupled the tire 200 using fluid channels 108. First fluid channels 108*a* may transport fluid 106 in a direction from the reservoir 102 to the tire 200. Second fluid channels 108*b* may transport fluid 202 in a direction from the tire 200 to the reservoir 102.

The system 100 comprises a compressor 110 disposed in the fluid path defined by the second fluid channels 108*b* and configured to compress the fluid 202 from the tire 200 and supply it to the reservoir 102. This ensures the rapid pressurisation of the fluid 202 when it is supplied from the tire 200 to the reservoir 102. In some examples, the compressor 110 is configured to compress the fluid 202 from the tire 200 from the second pressure to the first pressure, and supply it to the reservoir 102. This means that the same fluid can be reused in the system 100 to supply the tire 200 at a later stage, and enables the size of the reservoir to be reduced. It will be appreciated that the fluid 202 from the tire 200 could be compressed to any suitable value. In some examples, the reservoir 102 may comprise a pump 112 to supply fluid from the reservoir 102, although this may not be necessary due to the relatively high pressure in the reservoir 102.

The system may also comprise one or more valves 114 configured to control fluid flow between the reservoir 102 and the tire 200. A first valve 114*a* is configured to control fluid flow in the first fluid channels 108*a*, while a second valve 114*b* is configured to control fluid flow in the second fluid channels 108*b*. These operations will be described in more detail below, for example in relation to FIG. 3. In some examples, the pump 112 may be sufficient to control fluid flow in the first fluid channels 108*a*, and so the valve 114*a* may not be necessary. In some examples, the compressor 110 may be sufficient to control fluid flow in the second fluid channels 108*b*, and so the second valve 114*b* may not be necessary.

The control unit 104 is configured to control operation of the system 100. The control unit 104 comprises processing circuitry configured to implement various operations disclosed below, for example in relation to FIG. 3. The control unit 104 may include a memory storing instructions that, when executed by the processing circuitry, cause the processing circuitry to perform the various operations. The control unit 104 may be part of a global control system for the vehicle in which the system 100 is implemented.

For example, the control unit 104 may be communicatively coupled to the reservoir 102 in order to receive signals from the reservoir 102. For example, one or more sensors could be used to measure the pressure and/or temperature of the fluid 106 in the reservoir 102. This can remove the need for sensors to be placed elsewhere in the system 100, or can be used as input for cooling the reservoir 102 when necessary. The control unit 104 may also control the pump 112, if present.

The control unit 104 may also be configured to be communicatively coupled to the compressor 110. The control unit 104 can thereby control the supply of fluid in a direction from the tire 200 to the reservoir 102 using the compressor 110. Furthermore, the control unit 104 can control the degree of compression of the fluid that is supplied from the tire 200 to the reservoir 102.

The control unit 104 may also be configured to be communicatively coupled to the valves 114 in order to control fluid flow between the reservoir 102 and the tire 200.

The control unit 104 may also be configured to be communicatively coupled to the tire 200 in order to receive signals from the tire 200, for example from one or more sensors 204. The sensors 204 may comprise one or more temperature sensors and/or one or more pressure sensors.

The control unit 104 may also be communicatively coupled to a user interface 116, via which an operator can provide commands to the system 100, and by which system values can be provided to the operator. The user interface 116 may be part of a global control system for the vehicle in which the system 100 is implemented.

In some examples, the system may further comprise a cooling system 118 coupled to the reservoir 102. The cooling system 118 is configured to regulate the temperature of the fluid 106 in the reservoir 102. This in turn enables cooling of the tire 200, as the fluid is both cooler initially and becomes even cooler as the pressure decreases. Furthermore, due to repeated compression of fluid between the tire 200 and the reservoir 102 over a number of operation cycles of the system 100, the temperature of the fluid 106 in the reservoir 102 may increase. This may have repercussions for the eventual temperature of the fluid 202 in the tire 200. The implementation of the cooling system 118 allows these temperatures to be controlled actively. The cooling system 118 may also regulate the pressure of the fluid 106 in the reservoir 102 as the pressure is dependent on the temperature. The cooling system 118 ensures that the fluid 106 in the reservoir 102 is kept at safe conditions, thus extending the life of the reservoir 102 and the system 100 as a whole. The temperature may also be regulated by circulating fluid between the reservoir 102 and the tire 200 continuously through the first and second fluid channels 108*a*, 108*b*.

In some examples, the fluid 106 in the reservoir 102 and the fluid 202 in the tire 200 are the same type of fluid. For example, the fluid 106 in the reservoir 102 and the fluid 202 in the tire 200 may be air. In some examples, the fluid 106 in the reservoir 102 and the fluid 202 in the tire 200 may be different phases of the same fluid (e.g. a liquid phase in the reservoir 102 and gas phase in the tire 200).

In some examples, the at least one tire 200 may comprise two or more tires 200 on a common axle of a vehicle. In this way, the system 100 is able to regulate pressure in multiple tires 200 at once, thus reducing the footprint of the system 100 on the vehicle. This can also ensure that tires 200 on a common axle are operating at the same pressure. To enable this, fluid channels 108 may extend along or within the axle in order to provide adequate fluid transport. The fluid channels 108 may be attached to the tires 200 by a suitable joint, for example a swivel joint that facilitates fluid-tight transportation between the tires 200 and the pressure regulation system 100.

The system 100 may be implemented in any suitable type of vehicle, for example heavy-duty vehicles, such as trucks, buses, and construction equipment, among other vehicle types. The system 100 provides rapid and adaptive adjustment of tire pressure during vehicle operation. This ensures that, in situations such as changing load or ground conditions, it is ensured that the tire pressure is appropriate for the specific operating condition. The system 100 may be particularly advantageous in construction vehicles that encounter varying load and ground conditions, such as wheel loaders or articulated haulers, where tire pressure can significantly affect vehicle operation. The system 100 may be particularly advantageous in vehicles that operate "off-road", and/or transition between on- and off-road operations.

In some examples, the reservoir 102, the fluid channels 108, and the at least one tire 200 may form a closed loop system. This enables the same fluid to be used repeatedly for increasing and decreasing the pressure in the tire 200, thus reducing of any requirement to resupply the system 100 after use. This also reduces the time and power required to fill the reservoir 102 after use. As such, the system 100 is applicable to vehicles with long operating times or that are used in remote locations. In some examples, however, it may be desired to release fluid to the atmosphere for safety reasons. For example, if the pressure in the system becomes too high, it may be desired to urgently reduce the pressure. Therefore, in some examples, the valves 114 may have an additional channel to the surrounding atmosphere for urgent pressure compensation of the system 100. There may also be an additional channel, for example to the compressor 110, in order to initially fill the system 100 and/or to enable introduction of fluid on occasions when the pressure is too low.

Figure 2:
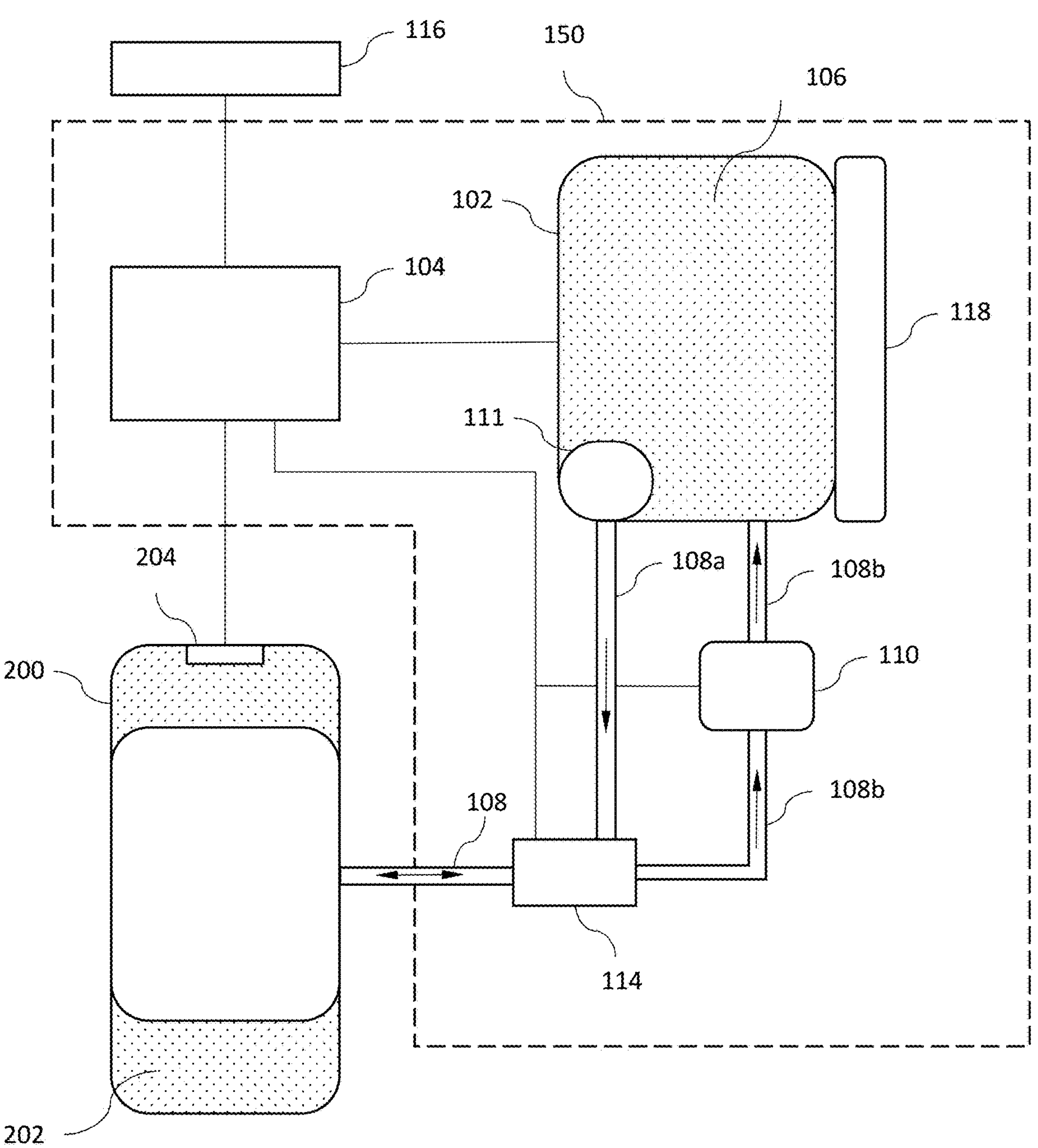
FIG. 2 schematically shows a system for regulating the pressure of fluid in at least one tire of a vehicle, according to another example.

FIG. 2 schematically shows a system 150 for regulating the pressure of fluid in at least one tire of a vehicle, according to a second example. The system 150 is substantially the same as the system 100 of FIG. 1, except that a single valve 114 is used to control fluid flow both in a direction from the reservoir 102 to the tire 200 and in a direction from the tire 200 to the reservoir 102.

In another example, the system may comprise a single bidirectional fluid channel 108 between the tire 200 and the reservoir 102, for example enabled by a compressor 110 having a bypass for the fluid to travel from the reservoir 102 to the valve 114. In another example, the compressor 110 or an additional compressor may be implemented downstream of the reservoir 102, for example in fluid channel 108*a*, in order to compress the fluid before it reaches the tire 200.

Figure 3:
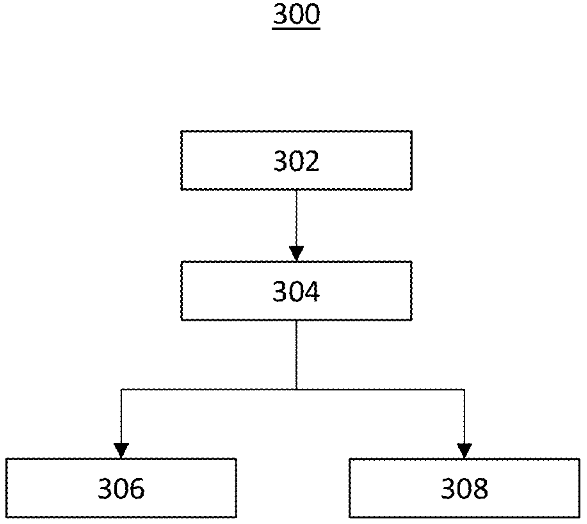
FIG. 3 is a flow chart of an example computer-implemented method according to an example.

FIG. 3 is a flow chart of an example computer-implemented method 300 according to an example. The method 300 may be performed by the control unit 104 described in relation to FIGS. 1 and 2.

At 302, the control unit 104 may receive data representing at least one condition of the fluid 202 in the tire 200. In particular, the data may comprise data representing a pressure of the fluid 202 in the tire 200 and/or a temperature of the fluid 202 in the tire 200. By monitoring different parameters, the pressure of the fluid 202 in the tire 200 can be managed in different ways and adapted to different operating requirements, as will be discussed below.

This data can be used to assess the operating conditions of the tire 200 and determine if a pressure change is required. In some examples, the control unit 104 receives the data from the sensors 204 in the tire 200. This enable the pressure to be regulated based on actual operating conditions of the tire 200. In some examples, the control unit 104 receives the data from sensors elsewhere in the system 100. For example, sensors in the fluid channels 108 may indicate the condition of the fluid 202 in the tire 200 with sufficient accuracy that sensors are not required in the tire 200 itself. In some examples, the control unit 104 receives the data from the user interface 116. For example, an operator may measure the temperature or pressure of the fluid 202 in the tire 200 and input this to the user interface.

At 304, the control unit 104 receives a desired change to the condition of the fluid 202 in the tire 200. In some examples, the control unit may determine, based on the received data, whether an increase or decrease to the pressure or temperature of the fluid 202 in the tire 200 is desired. For example, if the data received by the control unit 104 indicates that the pressure of the fluid 202 in the tire 200 is 1.6 bar, and the particular mode of operation of the vehicle would be improved by operating at a tire pressure of 1.8 bar, then the control unit 104 determines that the pressure of the fluid 202 in the tire 200 should be increased. Similarly, if the temperature of the fluid 202 in the tire 200 is 60° C., and a safe operating temperature for the tire 200 is 55° C., then the control unit 104 determines that the temperature of the fluid 202 in the tire 200 should be decreased.

The control unit 104 may have access to a database or lookup table that indicates desired operating ranges for pressure and temperature for different modes of operation. The mode of operation that the vehicle is operating in could be input by an operator to the user interface 116, or could be detected by the control unit or other vehicle system, for example based on camera detection of ground conditions, GPS data, time of day, machine usage data such as forward/reverse gear, steering angle, or other CAN data, and the like. The control unit 104 can then determine a desired change to a condition of the fluid 202 in the tire 200 for the specific mode of operation based on the received data.

In other examples, 302 may be omitted and the control unit 104 may receive a desired change to the condition of the fluid 202 in the tire 200 directly. For example, an operator may make an input to the user interface 116 indicating that the pressure of the fluid 202 in the tire 200 should be reduced. In this way, the change can be controlled directly by the operator without the need for sensor data or for the control unit 104 to receive a value and make its own determination. The input could be made by the operator, for example, before entering a particular work area or starting a particular task. Alternatively, a separate control system of the vehicle may determine the change and transmit this information to the control unit 104.

At 306, if the desired change comprises an increase in the pressure of the fluid 202 in the tire 200, the control unit 104 causes fluid 106 from the reservoir 102 to be supplied to the tire 200. This may be the case if it is determined that the pressure of the fluid 202 in the tire 200 is too low. It may also be the case if it is determined that the temperature of the fluid 202 in the tire 200 is too low, as increasing the pressure of the fluid 202 will also result in an increase of the temperature.

For example, the control unit 104 may transmit a signal to the valve 114*a*, 114 in order to allow fluid flow out of the reservoir 102. Due to the pressure gradient between the reservoir 102 and the tire 200, the fluid 106 will travel from the reservoir 102 to the tire 200, thus increasing the pressure of the fluid 202 in the tire 200. Alternatively or additionally, the control unit 104 may transmit a signal to the pump 110 in order to cause fluid flow out of the reservoir 102.

At 308, if the desired change comprises a decrease in the pressure of the fluid 202 in the tire 200, the control unit 104 causes fluid 202 from the tire 200 to be supplied to the reservoir 102. This may be the case if it is determined that the pressure of the fluid 202 in the tire 200 is too high. It may also be the case if it is determined that the temperature of the fluid 202 in the tire 200 is too high, as decreasing the pressure of the fluid 202 will also result in a decrease of the temperature.

For example, the control unit 104 may transmit a signal to the compressor 110 for the compressor 110 to supply the fluid 202 from the tire 200 to the reservoir 102. In some examples, the control unit 104 may transmit a signal to the compressor 110 for the compressor 110 to compress the fluid 202 from the second pressure to the first pressure. The control unit 104 may also transmit a signal to the valve 114*b*, 114 in order to allow fluid flow from the tire 200 to the reservoir 102.

In some examples, the system 100 can be operated to "breathe" the tire 200. For example, if the fluid 202 in the tire 200 is warm, this fluid can be supplied to the compressor 110 while fluid 106 from the reservoir 102 cooled by the cooling system 118 can be supplied to the tire 200 to lower the tire temperature. The cool fluid 106 from the reservoir 102 would become even cooler as its pressure is reduced to the pressure in the tire 200. This may be part of a work cycle where pressure needs to be regulated for various reasons. By circulating fluid between the tire and the reservoir, the pressure and temperature of the tire can be regulated as part of a work cycle, ensuring an appropriate pressure can be provided without undue heating of the temperature in the tire.

The disclosed systems, methods and approaches for regulating the pressure of fluid in at least one tire of a vehicle provide rapid adaptive adjustment of tire pressure during vehicle operation dependent on the operating conditions of the vehicle, and tire cooling by transporting heat energy from the tires to the reservoir. These advantages are particularly helpful in cases where load conditions or ground conditions change frequently during vehicle usage, and provides improvements in tire wear, fuel consumption, vehicle stability, and the like. The pressurized air can be released into tires rapidly from the high-pressure reservoir and provided back to the reservoir when no longer needed in the tires, which reduces any requirement to resupply the system after use.

In one particular use case, a wheel loader may require a lower tire pressure when entering an area where a material load is collected from a pile, in order to provide increased traction on uneven ground and for improved comfort and improved tire life. The wheel loader may then require a higher tire pressure when lifting the material from the pile, as this can increase stability whilst the increased traction is no longer required. During transport with the collected load, for example on an even road, the wheel loader may require a higher tire pressure for improved stability, improved tire life, and reduced fuel consumption. The disclosed systems, methods and approaches enable the rapid adaptive adjustment of tire pressure that provides more suitable tire pressures for different stages of operation.

Figure 4:
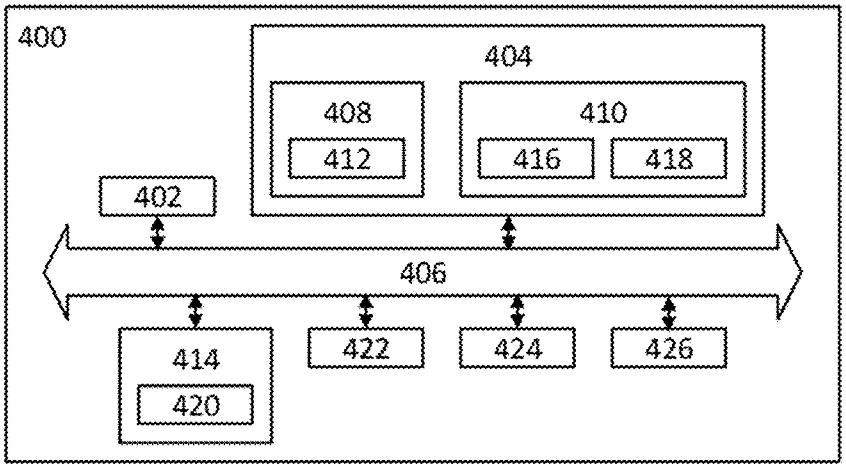
FIG. 4 is a schematic diagram of an exemplary computer system for implementing examples disclosed herein, according to an example.

FIG. 4 is a schematic diagram of a computer system 400 for implementing examples disclosed herein. The computer system 400 is adapted to execute instructions from a computer-readable medium to perform these and/or any of the functions or processing described herein. The computer system 400 may be connected (e.g., networked) to other machines in a LAN, an intranet, an extranet, or the Internet. While only a single device is illustrated, the computer system 400 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 400 may comprise at least one computing device or electronic device capable of including firmware, hardware, and/or executing software instructions to implement the functionality described herein. The computer system 400 may include processing circuitry 402 (e.g., processing circuitry including one or more processor devices or control units), a memory 404, and a system bus 406. The computer system 400 may include at least one computing device having the processing circuitry 402. The system bus 406 provides an interface for system components including, but not limited to, the memory 404 and the processing circuitry 402. The processing circuitry 402 may include any number of hardware components for conducting data or signal processing or for executing computer code stored in memory 404. The processing circuitry 402 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 402 may further include computer executable code that controls operation of the programmable device.

The system bus 406 may be any of several types of bus structures that may further interconnect to a memory bus (with or without a memory controller), a peripheral bus, and/or a local bus using any of a variety of bus architectures. The memory 404 may be one or more devices for storing data and/or computer code for completing or facilitating methods described herein. The memory 404 may include database components, object code components, script components, or other types of information structure for supporting the various activities herein. Any distributed or local memory device may be utilized with the systems and methods of this description. The memory 404 may be communicably connected to the processing circuitry 402 (e.g., via a circuit or any other wired, wireless, or network connection) and may include computer code for executing one or more processes described herein. The memory 404 may include non-volatile memory 408 (e.g., read-only memory (ROM), erasable programmable read-only memory (EPROM), electrically erasable programmable read-only memory (EEPROM), etc.), and volatile memory 410 (e.g., random-access memory (RAM)), or any other medium which can be used to carry or store desired program code in the form of machine-executable instructions or data structures and which can be accessed by a computer or other machine with processing circuitry 402. A basic input/output system (BIOS) 412 may be stored in the non-volatile memory 408 and can include the basic routines that help to transfer information between elements within the computer system 400.

The computer system 400 may further include or be coupled to a non-transitory computer-readable storage medium such as the storage device 414, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 414 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 414 and/or in the volatile memory 410, which may include an operating system 416 and/or one or more program modules 418. All or a portion of the examples disclosed herein may be implemented as a computer program 420 stored on a transitory or non-transitory computer-usable or computer-readable storage medium (e.g., single medium or multiple media), such as the storage device 414, which includes complex programming instructions (e.g., complex computer-readable program code) to cause the processing circuitry 402 to carry out actions described herein. Thus, the computer-readable program code of the computer program 420 can comprise software instructions for implementing the functionality of the examples described herein when executed by the processing circuitry 402. In some examples, the storage device 414 may be a computer program product (e.g., readable storage medium) storing the computer program 420 thereon, where at least a portion of a computer program 420 may be loadable (e.g., into a processor) for implementing the functionality of the examples described herein when executed by the processing circuitry 402. The processing circuitry 402 may serve as a controller or control system for the computer system 400 that is to implement the functionality described herein.

The computer system 400 may include an input device interface 422 configured to receive input and selections to be communicated to the computer system 400 when executing instructions, such as from a keyboard, mouse, touch-sensitive surface, etc. Such input devices may be connected to the processing circuitry 402 through the input device interface 422 coupled to the system bus 406 but can be connected through other interfaces, such as a parallel port, an Institute of Electrical and Electronic Engineers (IEEE) 1394 serial port, a Universal Serial Bus (USB) port, an IR interface, and the like. The computer system 400 may include an output device interface 424, such as Loudspeaker or vibration actuator, configured to forward output, such as to a display, a video display unit (e.g., a liquid crystal display (LCD) or a cathode ray tube (CRT)). The computer system 400 may include a communications interface 426 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

According to certain examples, there is also disclosed:

Example 1. A system (100) for regulating the pressure of fluid (202) in at least one tire (200) of a vehicle, the system comprising:

a reservoir (102) fluidly coupled to the tire and comprising fluid (106) at a first pressure higher than the pressure of the fluid in the tire;

a compressor (110) configured to receive fluid from the tire and supply it to the reservoir; and processing circuitry (104) configured to:

receive a desired change to at least one condition of the fluid in the tire; and if the desired change comprises an increase in the pressure of the fluid in the tire, cause fluid from the reservoir to be supplied to the tire; or if the desired change comprises a decrease in the pressure of the fluid in the tire, cause fluid from the tire to be supplied to the reservoir via the compressor.

Example 2. The system (100) of example 1, further comprising a valve (114) configured to regulate the flow of fluid between the reservoir (102) and the tire (200) based on a signal from the processing circuitry (104).

Example 3. The system (100) of example 1 or 2, wherein the compressor (110) is configured to compress the fluid to the first pressure, and supply the compressed fluid to the reservoir (102).

Example 4. The system (100) of any preceding example, wherein the condition of the fluid (202) in the tire (200) comprises a pressure of the fluid in the tire and/or a temperature of the fluid in the tire.

Example 5. The system (100) of any preceding example, wherein the processing circuitry (104) is configured to receive data representing the at least one condition of the fluid (202) in the tire (200), and determine the desired change to the condition based on the received data.

Example 6. The system (100) of example 5, wherein the received data comprises sensor data from the vehicle or a user input received by the processing circuitry.

Example 7. The system (100) of any preceding example, wherein the fluid (106, 202) is air.

Example 8. The system (100) of any preceding example, wherein the reservoir (102) has a fixed volume.

Example 9. The system (100) of any preceding example, configured such that the reservoir (102) and the tire (200) form a closed loop system.

Example 10. The system (100) of any preceding example, further comprising a cooling system (118) associated with the reservoir (102) configured to regulate the temperature of the fluid (106) in the reservoir.

Example 11. The system (100) of any preceding example, wherein the at least one tire (200) comprises two or more tires on a common axle of the vehicle.

Example 12. A vehicle comprising the system (100) of any preceding example.

Example 13. The vehicle of example 12, wherein the vehicle is a construction vehicle.

Example 14. A computer-implemented method (300) for regulating the pressure of fluid (202) in at least one tire (200) of a vehicle, the method comprising, by processing circuitry of a computer system:

receiving a desired change to at least one condition of the fluid in the tire; and if the desired change comprises an increase in the pressure of the fluid in the tire, causing (306) fluid (106) at a first pressure higher than the pressure of the fluid in the tire to be supplied from a reservoir (102) to the tire; or if the desired change comprises a decrease in the pressure of the fluid in the tire, causing (308) fluid from the tire to be supplied to the reservoir via a compressor (110).

Example 15. The computer-implemented method (300) of example 14, wherein (306) causing fluid (106) to be supplied from the reservoir (102) to the tire (200) comprises causing a valve (100) to regulate the flow of fluid between the reservoir (102) and the tire.

Example 16. The computer-implemented method (300) of example 14 or 15, wherein causing (308) fluid (202) from the tire (200) to be supplied to the reservoir (102) comprises causing the compressor (110) to compress the fluid to the first pressure and supply the compressed fluid to the reservoir.

Example 17. The computer-implemented method (300) of any of examples 14 to 16, wherein the condition of the fluid (202) in the tire (200) comprises a pressure of the fluid in the tire and/or a temperature of the fluid in the tire.

Example 18. The computer-implemented method (300) of any of examples 14 to 17, comprising, by the processing circuitry:

receiving (302) data representing the at least one condition of the fluid (202) in the tire (200); and determining (304) the desired change to the condition based on the received data.

Example 19. The computer-implemented method (300) of example 18, wherein the received data comprises sensor data from the vehicle or a user input.

Example 20. A computer system comprising processing circuitry configured to perform the computer-implemented method (300) of any of examples 14 to 19.

Example 21. A computer program product comprising program code for performing, when executed by processing circuitry, the computer-implemented method (300) of any of examples 14 to 19.

Example 22. A non-transitory computer-readable storage medium comprising instructions, which when executed by processing circuitry, cause the processing circuitry to perform the computer-implemented method (300) of any of examples 14 to 19.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A system for regulating a pressure of fluid in at least one tire of a vehicle, the system comprising: a reservoir fluidly coupled to the tire and comprising fluid at a first pressure higher than the pressure of the fluid in the tire; a compressor configured to receive fluid from the tire and supply it to the reservoir; and processing circuitry configured to: receive a desired change to at least one condition of the fluid in the tire; and if the desired change comprises an increase in the pressure of the fluid in the tire, cause fluid from the reservoir to be supplied to the tire; if the desired change comprises a decrease in the pressure of the fluid in the tire, cause fluid from the tire to be supplied to the reservoir via the compressor; and if the desired change comprises a decrease in a temperature of the fluid in the tire, cause fluid from the reservoir to be supplied to the tire and cause fluid from the tire to be supplied to the reservoir.

2. The system of claim 1, further comprising a valve configured to regulate the flow of fluid between the reservoir and the tire based on a signal from the processing circuitry.

3. The system of claim 1, wherein the compressor is configured to compress the fluid to the first pressure and supply the compressed fluid to the reservoir.

4. The system of claim 1, wherein the condition of the fluid in the tire comprises a pressure of the fluid in the tire and/or a temperature of the fluid in the tire.

5. The system of claim 1, wherein the processing circuitry is configured to receive data representing the at least one condition of the fluid in the tire and determine the desired change to the condition based on the received data.

6. The system of claim 1, configured such that the reservoir and the tire form a closed loop system.

7. A vehicle comprising the system of claim 1.

8. A computer-implemented method for regulating a pressure of fluid in at least one tire of a vehicle, the method comprising, by processing circuitry of a computer system: receiving a desired change to at least one condition of the fluid in the tire; and if the desired change comprises an increase in the pressure of the fluid in the tire, causing fluid at a first pressure higher than the pressure of the fluid in the tire to be supplied from a reservoir to the tire; or if the desired change comprises a decrease in the pressure of the fluid in the tire, causing fluid from the tire to be supplied to the reservoir via a compressor; and if the desired change comprises a decrease in a temperature of the fluid in the tire, causing fluid from the reservoir to be supplied to the tire and causing fluid from the tire to be supplied to the reservoir.

9. The computer-implemented method of claim 8, wherein causing fluid to be supplied from the reservoir to the tire comprises causing a valve to regulate the flow of fluid between the reservoir and the tire.

10. The computer-implemented method of claim 8, wherein causing fluid from the tire to be supplied to the reservoir comprises causing the compressor to compress the fluid to the first pressure and supply the compressed fluid to the reservoir.

11. The computer-implemented method of claim 8, wherein the condition of the fluid in the tire comprises a pressure of the fluid in the tire and/or a temperature of the fluid in the tire.

12. The computer-implemented method of claim 8, comprising, by the processing circuitry: receiving data representing the at least one condition of the fluid in the tire; and determining the desired change to the condition based on the received data.

13. A computer system comprising processing circuitry configured to perform the computer-implemented method of claim 8.

14. A computer program product comprising program code for performing, when executed by processing circuitry, the computer-implemented method of claim 8.

15. A non-transitory computer-readable storage medium comprising instructions, which when executed by processing circuitry, cause the processing circuitry to perform the computer-implemented method of claim 8.

* * * * *